(12) United States Patent
Natsume

(10) Patent No.: US 6,639,437 B2
(45) Date of Patent: Oct. 28, 2003

(54) METHOD AND APPARATUS FOR DATA SAMPLING

(75) Inventor: Kenichi Natsume, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 10/341,352

(22) Filed: Jan. 14, 2003

(65) Prior Publication Data

US 2003/0098723 A1 May 29, 2003

Related U.S. Application Data

(62) Division of application No. 10/217,624, filed on Aug. 14, 2002, now Pat. No. 6,538,483, which is a division of application No. 09/769,422, filed on Jan. 26, 2001, now Pat. No. 6,472,913.

(51) Int. Cl.[7] .................................................. H03L 7/00
(52) U.S. Cl. ........................ 327/144; 327/91; 327/141
(58) Field of Search .............................. 327/141, 142, 327/147, 149, 144, 154, 156, 158, 291, 91, 93, 95

(56) References Cited

U.S. PATENT DOCUMENTS

| | | | |
|---|---|---|---|
| 4,361,895 A | 11/1982 | Khoudari | 327/141 |
| 5,022,056 A * | 6/1991 | Henderson et al. | 327/141 |
| 5,197,082 A | 3/1993 | Uda et al. | 327/166 |
| 5,475,320 A | 12/1995 | Ko | 327/387 |
| 5,574,756 A | 11/1996 | Jeong | 327/147 |
| 5,877,640 A | 3/1999 | Geerlings | 327/141 |
| 6,157,229 A | 12/2000 | Yoshikawa | 327/149 |
| 6,278,755 B1 * | 8/2001 | Baba et al. | 327/141 |
| 6,377,082 B1 | 4/2002 | Loinaz et al. | 327/156 |

* cited by examiner

Primary Examiner—Toan Tran
(74) Attorney, Agent, or Firm—Volentine Francos, PLLC

(57) ABSTRACT

A level-turning point of input data is detected; and a sampling clock is generated in response to the level-turning point of the input data. The input data are sampled in synchronization with the sampling clock.

6 Claims, 10 Drawing Sheets

METHOD AND APPARATUS FOR DATA SAMPLING

CROSS REFERENCE TO RELATED APPLICATIONS

This is a divisional application of application Ser. No. 10/217,624, filed on Aug. 14, 2002, now U.S. Pat. No. 6,538,483, which is a divisional application of application Ser. No. 09/769,422, filed Jan. 26, 2001, now U.S. Pat. No. 6,472,913 which applications are hereby incorporated by reference in their entirety for all purposes.

TECHNICAL FIELD OF THE INVENTION

The present invention relates to a logic LSI in which input data are sampled in synchronization with a clock signal.

BACKGROUND OF THE INVENTION

A conventional logic LSI includes a logic circuit, a register and a PLL (Phase Locked Loop) circuit. The register is connected to a clock input terminal to an output terminal of the PLL circuit. The register receives input data and generates an output signal Q in synchronization with a clock signal generated in the PLL circuit to have a constant phase. In other words, the logic circuit samples the input data in synchronization with the constant clock signal.

According to the conventional logic LSI, if the input data is shifted in phase, the logic circuit could not sample the input data properly and mistakenly generates an unexpected output data.

OBJECTS OF THE INVENTION

Accordingly, an object of the present invention is to provide a data sampling circuit in which input data are sampled at appropriate timings to provide reliability of data sampling even if the input data are phase-shifted.

Another object of the present invention is to provide a method in which input data are sampled at appropriate timings to provide reliability of data sampling even if the input data are phase-shifted.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, a level-turning point of input data is detected; and a sampling clock is generated in response to the level-turning point of the input data. The input data are sampled in synchronization with the sampling clock. The input data can be sampled at an appropriate point or timing, because the sampling clock is generated in response to the level-turning point of the input data. A level-turning point means a point where the level of a signal changes to the opposite sate, for example, the point can be called "signal rising point" or "signal falling point". A sampling point means a point where the input data are sampled.

Preferably, the sampling clock has a sampling point provided in the middle of a normal cycle of the input data. The sampling clock may be generated in response to the base clock having a frequency that is eight times greater than the normal frequency of the input data.

In an embodiment, a plurality of source clocks is generated to have different phases shifted one by one, and one of the source clocks is selected as the sampling clock.

In another embodiment, an average phase signal representing the average of phase of plural source clocks, provided in the past, is generated. One from the average signal and currently generated sampling clock is selected to provide a sampling clock to be actually used for sampling process. Preferably, a previous sampling clock and currently generated sampling clock are compared to detect a phase difference between them; and the sampling operation is prohibited when the phase difference between the previous sampling clock and currently generated sampling clock is larger than a predetermined threshold value. According to this embodiment, it is not necessary to generate a sampling clock for each cycle of the input data. As a result, power consumption of the circuit can be reduced.

In another embodiment, the sampling clock has a first level-turning point synchronizing with a level-turning point of the input data and a second level-turning point provided right in the middle of a normal cycle of the input data. More precisely, a source clock, which is to be a source of the sampling clock, is generated. The source clock is compared with a predetermined reference signal, and the phase of the source clock is controlled in response to a result of the comparison. According to this embodiment, the sampling point can be provided at the same timing from the level-turning point of the input data regardless the frequency of the base clock. For instance, the sampling point is provided after four cycles of base clock from the detected level-turning point of the input data.

According to a second aspect of the present invention, a data sampling circuit includes an edge detecting circuit which detects level-turning points of input data; a sampling clock generating circuit which generates a sampling clock in response to the level-turning point of the input data; and a logic circuit which samples the input data in synchronization with the sampling clock.

Preferably, according to an embodiment, a data sampling circuit includes a PLL (Phase Locked Loop) circuit which generates a base clock having a frequency that is greater than a normal frequency of input data; an edge detecting circuit which detects level-turning points of the input data in response to the base clock; a source clock generating circuit which generates, in response to the base clock, a plurality of source clocks having different phases shifted by one cycle of the base clock one by one; a clock selecting circuit which selects one from the plural source clocks as the sampling clock so that the sampling clock has a first level-turning point synchronizing with a first level-turning point of the input data and a second level-turning point generated right in the middle of the normal cycle of the input data; and a logic circuit sampling the input data in synchronization with the sampling clock.

Preferably according to another embodiment, a data sampling circuit includes a PLL (Phase Locked Loop) circuit which generates a base clock having a frequency that is greater than a normal frequency of input data; an edge detecting circuit which detects level-turning points of the input data in response to the base clock; a source clock generating circuit which generates a source clock in response to the base clock; a sampling clock generating circuit which generates a sampling clock having a sampling point provided in the middle of a normal cycle of the input data; and a logic circuit sampling the input data in synchronization with the sampling clock. The sampling clock generating circuit includes a source clock generating circuit which generates a source clock, which is to be a source of the sampling clock; and a frequency register which provides a reference signal. The source clock generating circuit compares the source clock with the reference signal; and controls the phase of the source clock in response to a result of the comparison.

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1A:
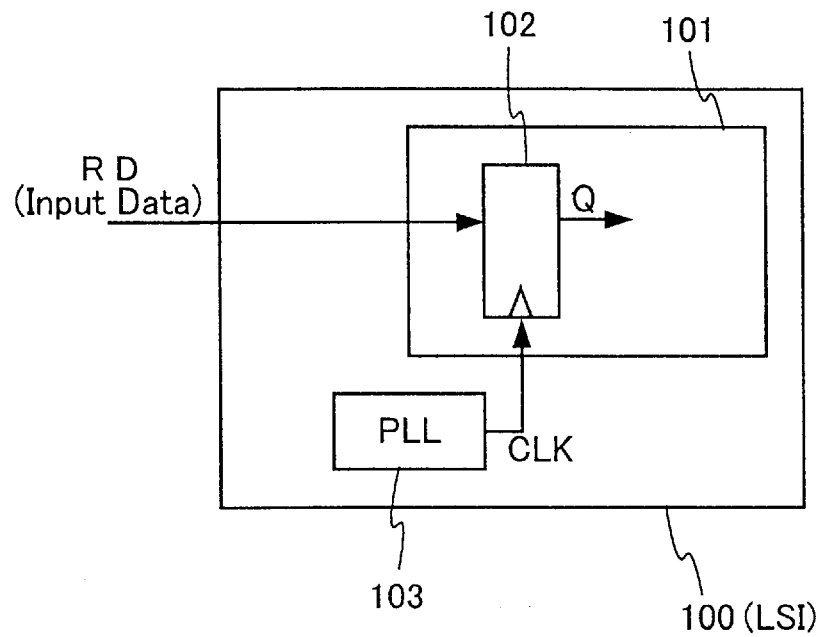
FIG. 1A is a block diagram showing a conventional logic LSI.
Figure 1B:
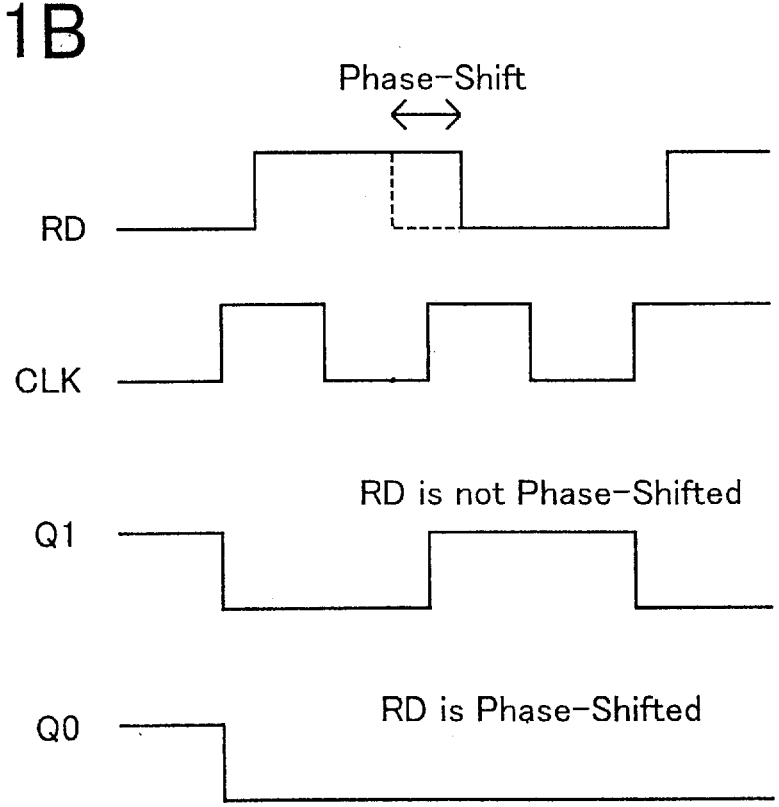
FIG. 1B is a timing chart showing the operation of the conventional logic LSI, shown in FIG. 1A.

The invention is described in greater detail hereinafter relative to a non-limitative embodiment and with reference to the attached drawings, wherein show:

For better understanding of the present invention, a conventional technology is first described in conjunction with FIGS. 1A and 1B. FIG. 1A is a block diagram showing a conventional logic LSI; and FIG. 1B is a timing chart showing the operation of the conventional logic LSI, shown in FIG. 1A. A conventional logic LSI 100 includes a logic circuit 101, a register 102 and a PLL (Phase Locked Loop) circuit 103. The register 102 is connected to a clock input terminal to an output terminal of the PLL circuit 103. The register 102 receives input data RD and generates an output signal Q in synchronization with a clock signal generated in the PLL circuit 103 to have a constant phase. In other words, the logic circuit 101 samples the input data RD in synchronization with the constant clock signal CLK.

According to the conventional logic LSI 100, shown in FIG. 1A, if the input data RD is shifted in phase, the logic circuit 101 could not sample the input data RD properly and mistakenly generates an unexpected output data Q0, as shown in FIG. 1B.

First Preferred Embodiment

Figure 2:
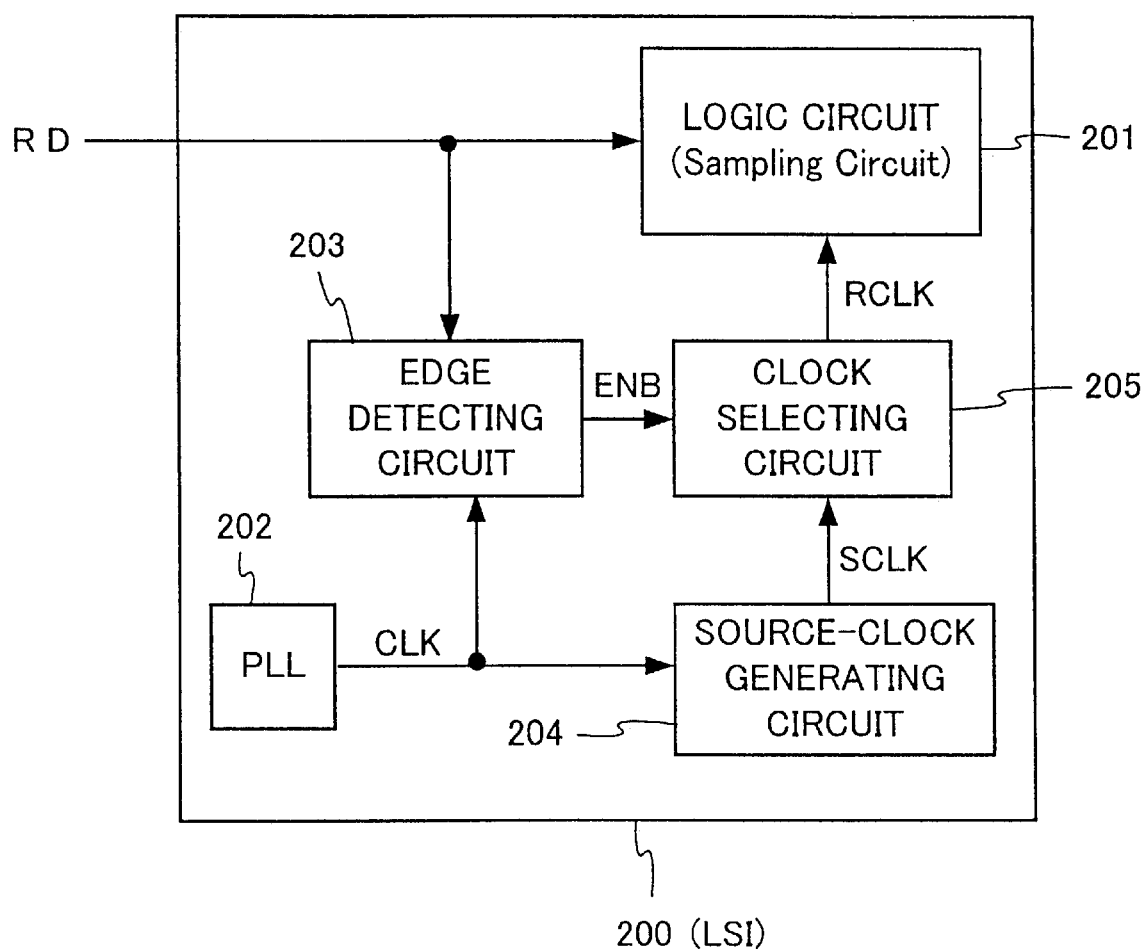
FIG. 2 is a block diagram showing a logic LSI according to a first preferred embodiment of the present invention.

FIG. 2 is a block diagram showing a logic LSI according to a first preferred embodiment of the present invention. A logic LSI 200 according to the first preferred embodiment includes a logic circuit (sampling circuit) 201, a PLL circuit 202, an edge detecting circuit 203, a source-clock generating circuit 204 and a clock selecting circuit 205. Input data RD are supplied to the logic circuit 201 and edge detecting circuit 203. The PLL circuit 202 is connected at an output terminal to input terminals of the edge detecting circuit 203 and source-clock generating circuit 204. The PLL circuit 202 supplies a base clock CLK to the edge detecting circuit 203 and source clock generating circuit 204.

The, edge detecting circuit 203 is connected to an output terminal to an input terminal of the clock-selecting circuit 205. The edge detecting circuit 203 supplies an ENB signal to the clock-selecting circuit 205. The edge detecting circuit 203 detects level-turning points of the input data RD in synchronization with the base clock CLK and generates the ENB signal when a level-turning point of the input data RD is detected.

The source-clock generating circuit 204 is connected at an output terminal to another input terminal of the clock selecting circuit 205. The source-clock generating circuit 204 supplies source clocks SCLKs to the clock selecting circuit 205. The source-clock generating circuit 204 generates source-clocks SCLK[0] to SCLK[7] in synchronization with the base clock CLK supplied from the PLL circuit 202. The clock selecting circuit 205 is connected at an output terminal to another input terminal of the logic circuit 201. The clock selecting circuit 205 supplies a sampling clock RCLK to the logic circuit 201.

The clock selecting circuit 205 selects one clock from the eight source-clocks SCLK[0] to SCLK[7], supplied from the source-clock generating circuit 204, in response to the ENB signal supplied from the edge detecting circuit 203. The logic circuit 201 samples the input data RD in synchronization with the sampling clock RCLK, supplied from the clock-selecting circuit 205.

Figure 3:
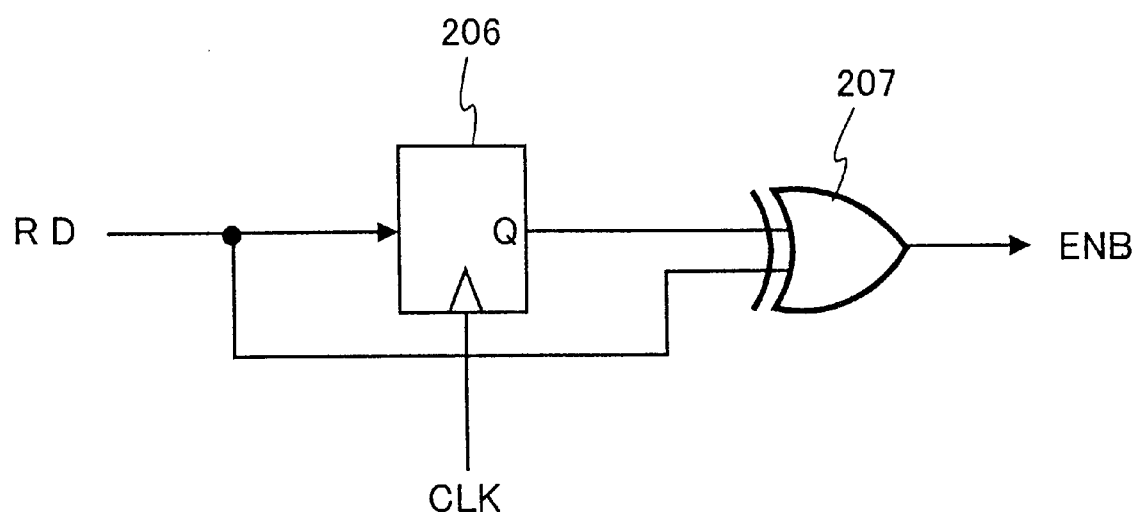
FIG. 3 is a block diagram showing an edge detecting circuit used in the logic LSI, shown in FIG. 2.

FIG. 3 is a block diagram showing the edge detecting circuit 203, shown in FIG. 2. The edge detecting circuit 203 includes a register 206 and an exclusive OR gate 207. The input data RD are supplied to an data input terminal of the register 206 and to an input terminal of the exclusive OR gate 207. The register 206 is supplied at a clock input terminal with the base clock CLK, supplied from the PLL circuit 202. The register 206 is connected at an output terminal Q to the other input terminal of the exclusive OR gate 207. The exclusive OR gate 207 is connected at an output terminal to the clock selecting circuit 205. In this embodiment, the base clock CLK is generated to have a frequency eight times greater than a normal frequency of the input data RD. The normal frequency is in that the input data RD are supplied to the LSI at a proper timing according to the circuitry design.

Figure 4:
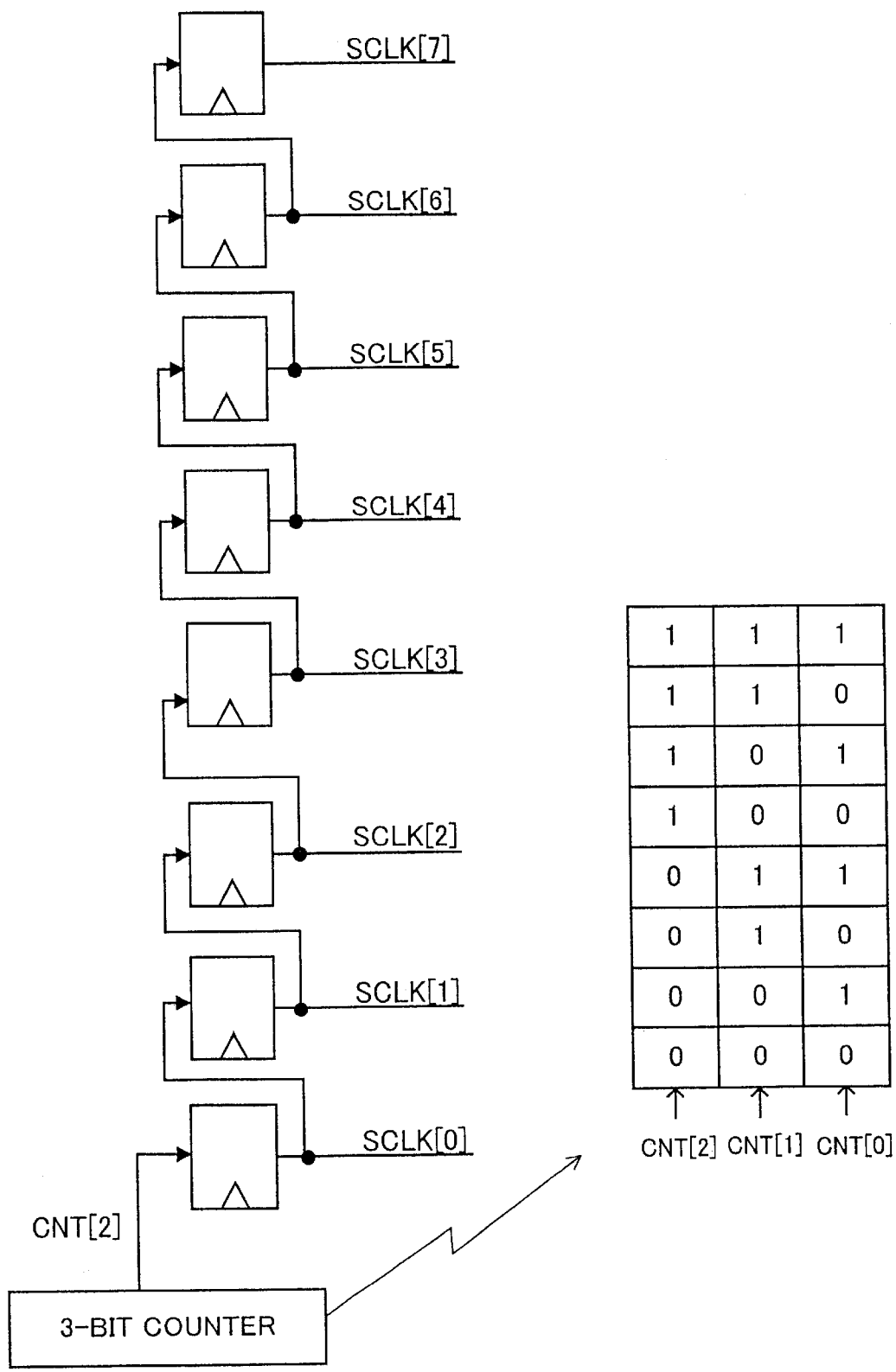
FIG. 4 is a block diagram showing a source clock generating circuit used in the logic LSI, shown in FIG. 2.

FIG. 4 is a block diagram showing the source-clock generating circuit 204 used in the logic LSI 200, shown in FIG. 2. The source-clock generating circuit 204 includes a 3-bit counter and eight FF (Flip-Flop) circuits supplying source clocks SCLK[0] to SCLK[7], respectively.

Figure 5:
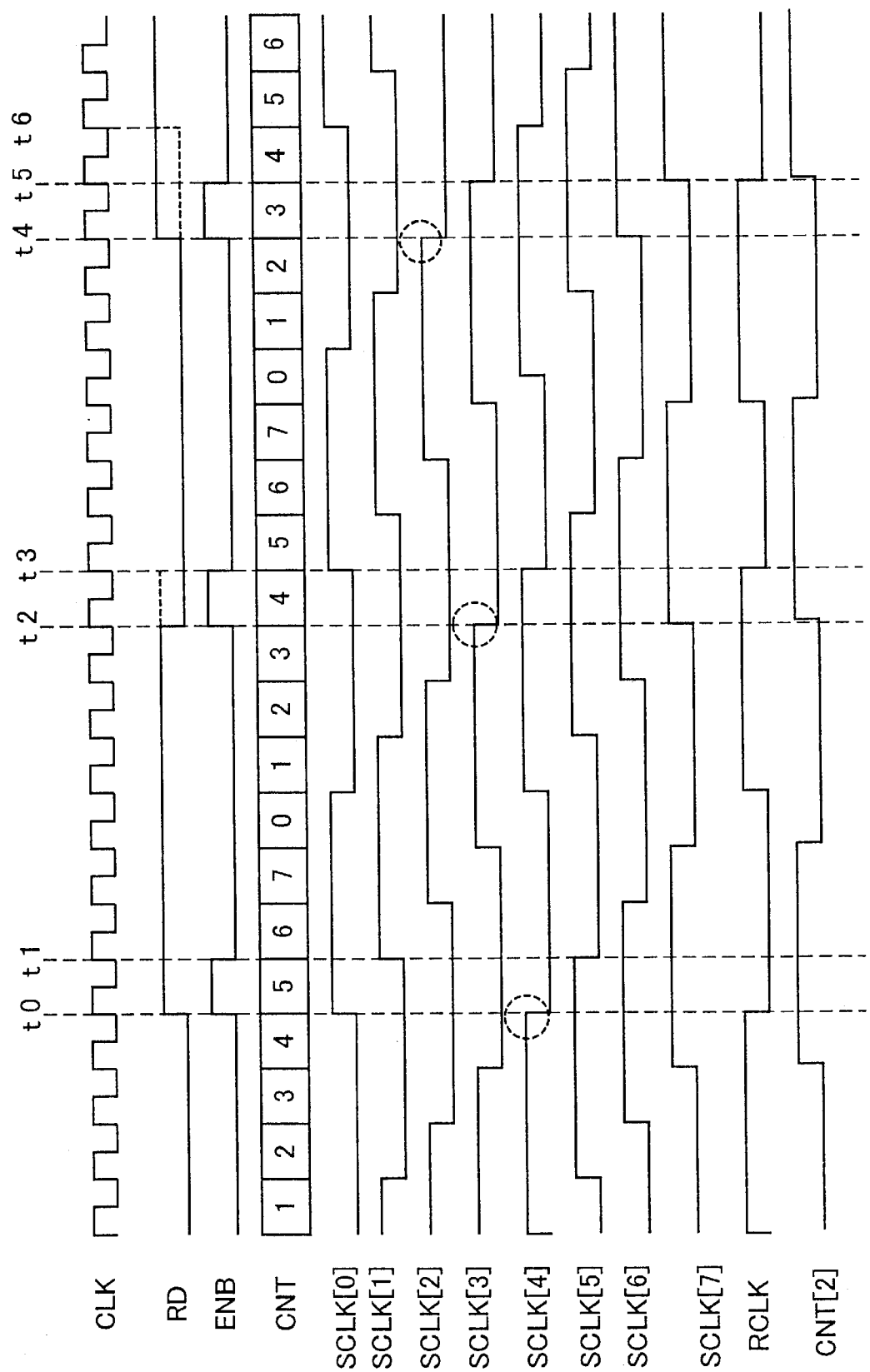
FIG. 5 is a timing chart showing the operation of the logic LSI, shown in FIG. 2.

Now the operation of the logic LSI 200, shown in FIG. 2 is described in reference to a timing chart shown in FIG. 5. It is assumed that the input data RD is undesirably phase-shifted, so that the signal RD is turned in level to high at t0, to low at t2 and is turned to high at t4. In the normal operation in which no phase-shift is made to the input data RD, the input data RD would be turned to low at t3 and is turned to high at t6, as shown with a dashed line. When the input data RD is turned in level to high "1" at t0, the signal ENB is turned to "1". The signal ENB is turned to "0" at t1. The signal ENB keeps its high state for one cycle of the base clock CLK every time when the input data RD is level-turned.

As shown in FIG. 4, when output signal CNT of the 3-bit counter is 4, 5, 6 or 7, CNT[2] becomes "1". When the output signal CNT of the 3-bit counter is 0, 1, 2 or 3, CNT[2] becomes "0". The source clock SCLK[0] has a phase one cycle delay to the CNT[2]. Since eight FF circuits are serially connected, the source clocks SCLK[0] to SCLK[7] have different phases shifted one by one. The difference corresponds to one cycle of the base clock CLK.

It is prefer that the input data RD are sampled in synchronization with the sampling clock RCLK within a period of time between t0 and t2. In other words, such a sampling clock RCLK is required and generated. Accordingly, a clock that turns to high four cycles later from t0 is selected as a sampling clock RCLK. It means that the sampling clock RCLK should be turned in level in a middle of the normal cycle of the input data RD. Preferably, the sampling clock RCLK is turned in level right in the middle of the normal cycle of the input data RD. For sampling the input data within a period between t0 to t2, the source clock SCLK[4], which is turned in level at t0, is selected as a sampling clock RCLK. The clock SCLK[4] is used until another signal ENB is generated at t2. In the same manner, the source clocks SCLK[3] and SCLK[4] are selected at t2 and t4, respectively, as the sampling clock RCLK.

As it can be understood, according to the first preferred embodiment, the sampling clock RCLK is generated in a middle of the normal cycle of the input data RD; and therefore, the input data RD can be sampled at an appropriate point or timing even if it is phase-shifted to some extent. As a result, the chance of sampling error is reduced.

In this application, a level-turning point means a point where the level of a signal changes to the opposite sate, for example, the point can be called "signal rising point" or "signal falling point". A sampling point means a point where the input data are sampled.

Second Preferred Embodiment

Figure 6:
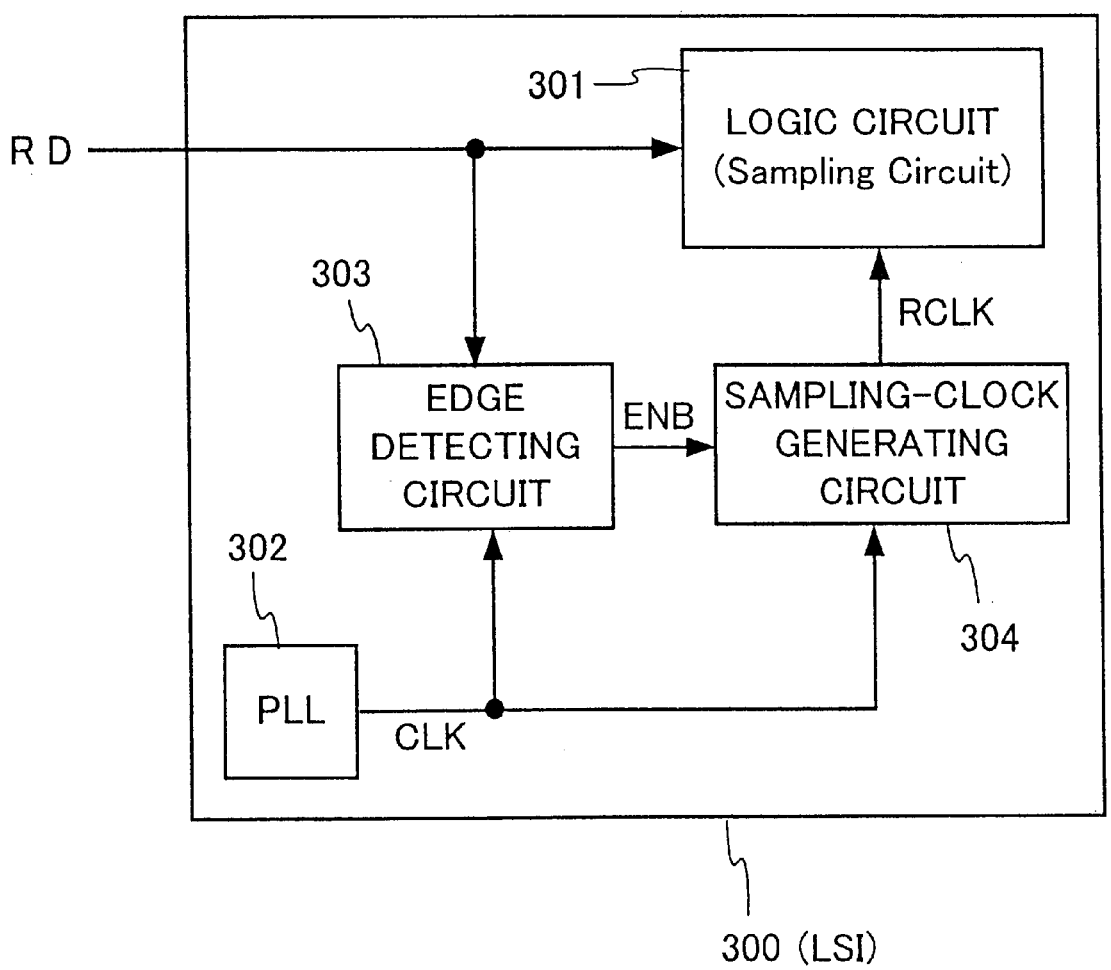
FIG. 6 is a block diagram showing a logic LSI according to a second preferred embodiment of the present invention.

FIG. 6 is a block diagram showing a logic LSI according to a second preferred embodiment of the present invention. A logic LSI 300 according to the second preferred embodiment includes a logic circuit 301, a PLL circuit 302, an edge detecting circuit 303 and a sampling-clock generating circuit 304. Input data RD are supplied to the logic circuit 301 and edge detecting circuit 303. The PLL circuit 302 is connected at an output terminal to input terminals of the edge detecting circuit 303 and sampling-clock generating circuit 304. The PLL circuit 302 supplies a base clock CLK to the edge detecting circuit 303 and sampling-clock generating circuit 304.

The edge detecting circuit 303 is connected to an output terminal to an input terminal of the sampling-clock generating circuit 305 to supply an ENB signal thereto. The edge detecting circuit 303 detects level-turning points of the input data RD in synchronization with the base clock CLK and generates the ENB signal when a level-turning point of the input data RD is detected. The sampling-clock generating circuit 304 is connected at an output terminal to another input terminal of the logic circuit 301.

The sampling-clock generating circuit 304 generates a sampling clock RCLK in response to the ENB signal, supplied from the edge detecting circuit 303. The logic circuit 301 samples the input data RD in synchronization with the sampling clock RCLK, supplied from the sampling-clock generating circuit 304.

Since the PLL circuit 302 and edge detecting circuit 303 may be the same as those for the first preferred embodiment, shown in FIGS. 2 and 3, the same description is no repeated hear for the second preferred embodiment.

Figure 7:
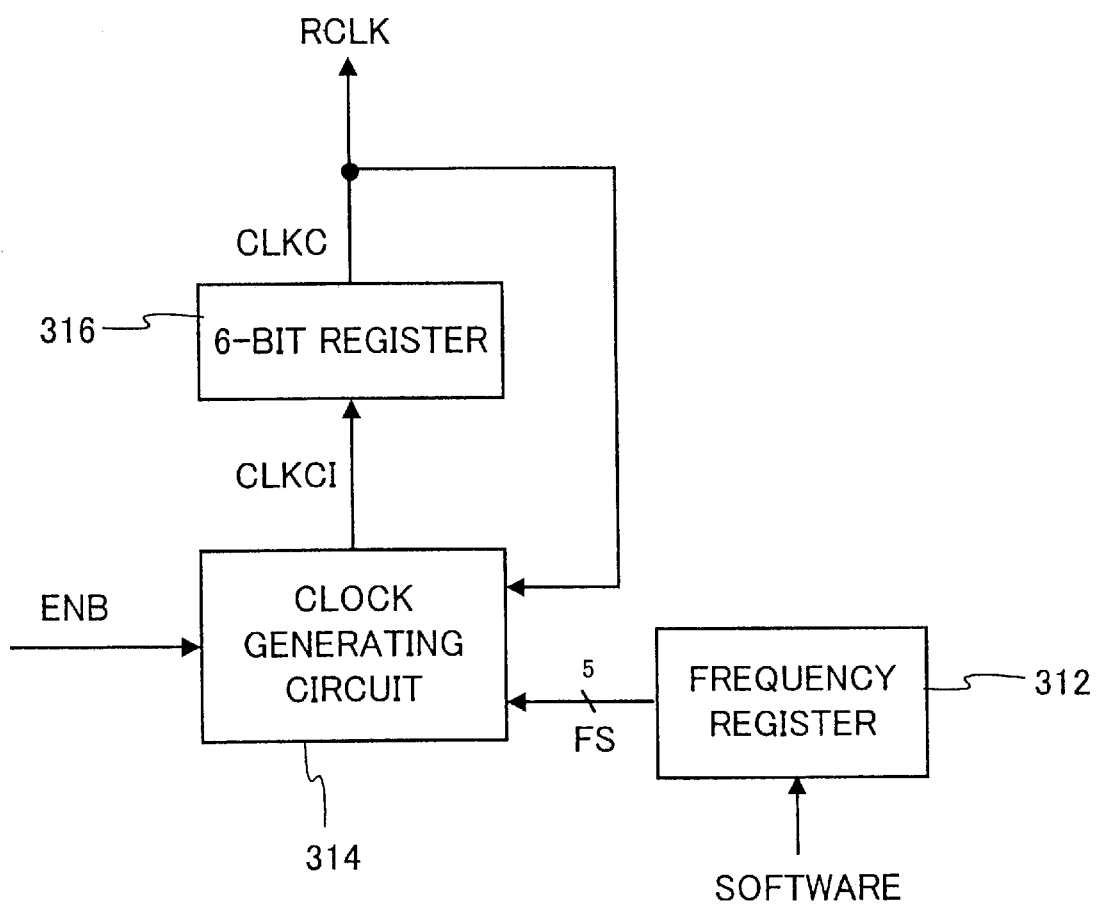
FIG. 7 is a block diagram showing a sampling-clock generating circuit used in the logic LSI, shown in FIG. 6.

FIG. 7 is a block diagram showing the sampling-clock generating circuit 304 used in the logic LSI 300, shown in FIG. 6. The sampling-clock generating circuit 304 includes a frequency register 312, a clock generating circuit 314 and a 6-bit register 316. The frequency register 312 is connected at an output terminal to an input terminal of the clock generating circuit 314.

The frequency register 312 provides a numeral signal FS in accordance with software or the like. The signal FS is calculated by a formula of "x/2−1", where "x" indicates eight in this embodiment because the frequency of the base clock CLK is eight times greater than the normal frequency of the input data RD. Accordingly, in this embodiment, the frequency register 312 provides the signal FS indicating "3". The frequency register 312 may be designed to store an uneven number selected one from 1, 3, 5, . . . 29, 31. If the 6-bit register 316 is designed to store more bits, the frequency register 312 could have more selection of numeral data stored therein. "x" can be up to 64 in this system, but must be even number.

The clock generating circuit 314 is connected at other two input terminals to the output terminal of the edge detecting circuit 303, shown in FIG. 6, and an output terminal of the 6-bit register 316. The clock generating circuit 314 is connected at an output terminal to an input terminal of the 6-bit register 316. The clock generating circuit 314 generates a clock signal CLKCI in accordance with the numeral signal FS, supplied from the frequency register 312, the signal ENB, supplied from the edge detecting circuit 303, and with an output signal CLKC, supplied from the 6-bit register 316.

The 6-bit register 316 is connected at the output terminal to the input terminal of the logic circuit 301, shown in FIG. 6. The signal CLKCI, supplied from the clock generating circuit 314, is set to one "1" when the signal ENB is one "1". The signal CLKCI is incremented when the signal ENB is zero "0". Even if the signal ENB is zero "0", CLKCI[4:0] is set to zero "0" when CLKC[4:0]=FS and CLKCI[5] is set to a numeral that is the inverted value of CLKC[5]. The last bit CLKC[5] of CLKC, supplied from the 6-bit register 316 is picked up and used as a sampling clock RCLK.

Figure 8:
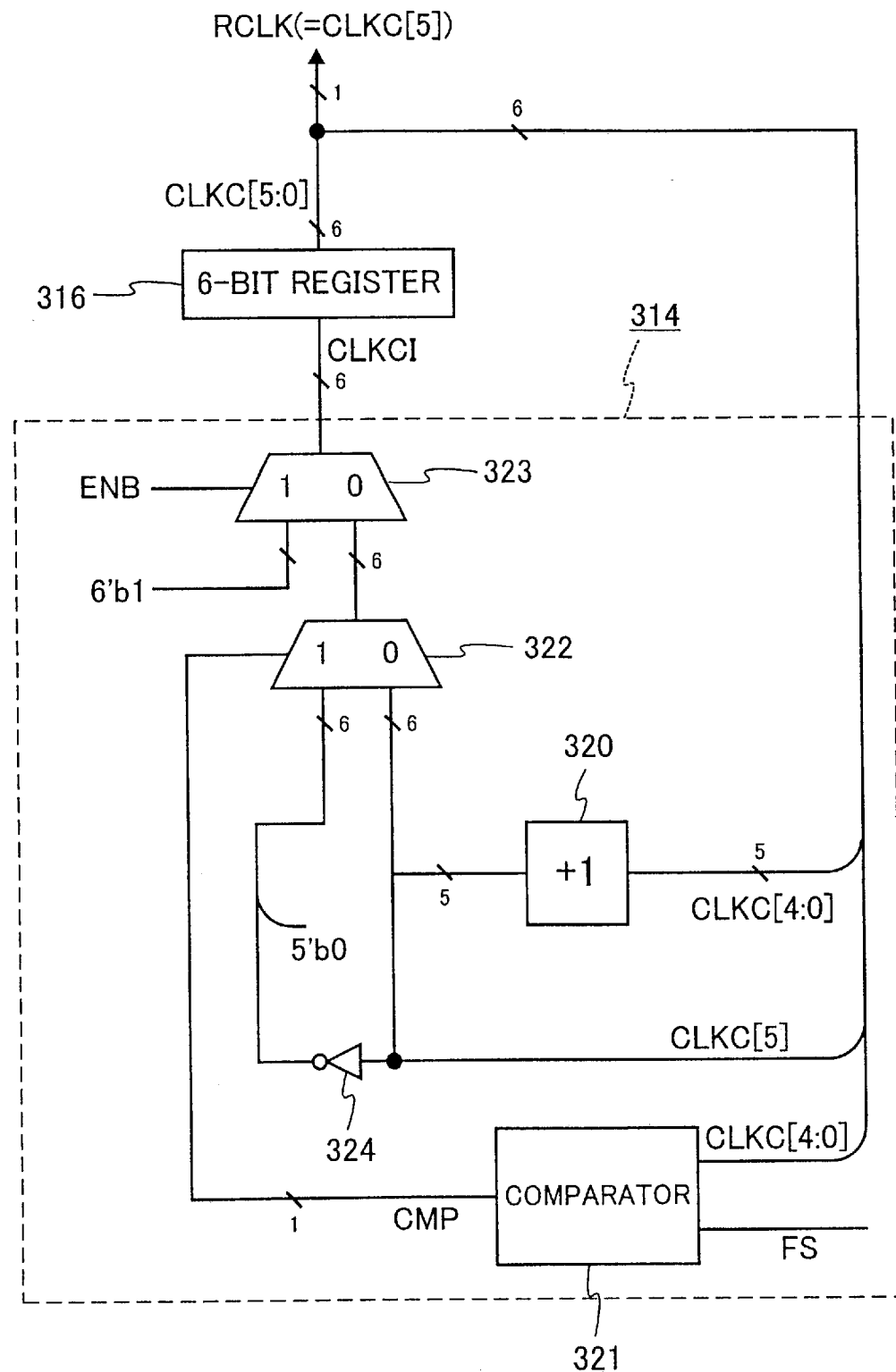
FIG. 8 is a block diagram showing the detailed structure of a clock generating circuit used in the sampling-clock generating circuit, shown in FIG. 7.

FIG. 8 is a block diagram showing the detailed circuitry of the clock generating circuit 314, shown in FIG. 7. The clock generating circuit 314 includes an adder 320, a comparator 321, selectors 322 and 323 and an inverter 324.

The comparator 321 is connected at an input terminal to the output terminal of the 6-bit register 316 and at an output terminal to a control terminal of the selector 322. The comparator is supplied with the signal FS from the frequency register 312. The comparator 321 compares the signals CLKC[4:0], corresponding to the last five bits of CLKC, to the FS signal, and supplies signals one "1" and zero "0" when those compared signals CLKC[4:0] and FS are identical and not identical, respectively.

The adder 320 is connected at an input terminal to the output terminal of the 6-bit register 316 and at an output terminal to an to an input terminal of the selector 322. The adder 320 adds one "1" to CLKC[4:0]. The inverter 324 is connected at an output terminal to the other input terminal of the selector 322. The inverter 324 inverts CLKC[5], which is the first one bit of CLKC, and supplies the inverted signal together with five-bit zero data "00000" to the selector 322.

The selector 322 is connected at an output terminal to an input terminal of the selector 323. When a signal "1" is supplied from the comparator 321 to the selector 322, the selector 322 selects the combination of the output of the inverter 324 and five-bit zero data "00000". When a signal "0" is supplied from the comparator 321 to the selector 322, the selector 322 selects the combination of the output (CLKC[4:0]+1) of the adder 320 and CLKC[5].

The selector 323 is supplied at a control terminal and the other input terminal with the ENB signal from the edge detecting circuit 303 and six-bit one data "000001", respectively. The selector 323 is connected at an output terminal to the input terminal of the 6-bit register 316. When the ENB is one "1", the selector 323 selects the signal "000001". When the ENB is zero "0", the selector 323 selects the output of the selector 322.

Figure 9:
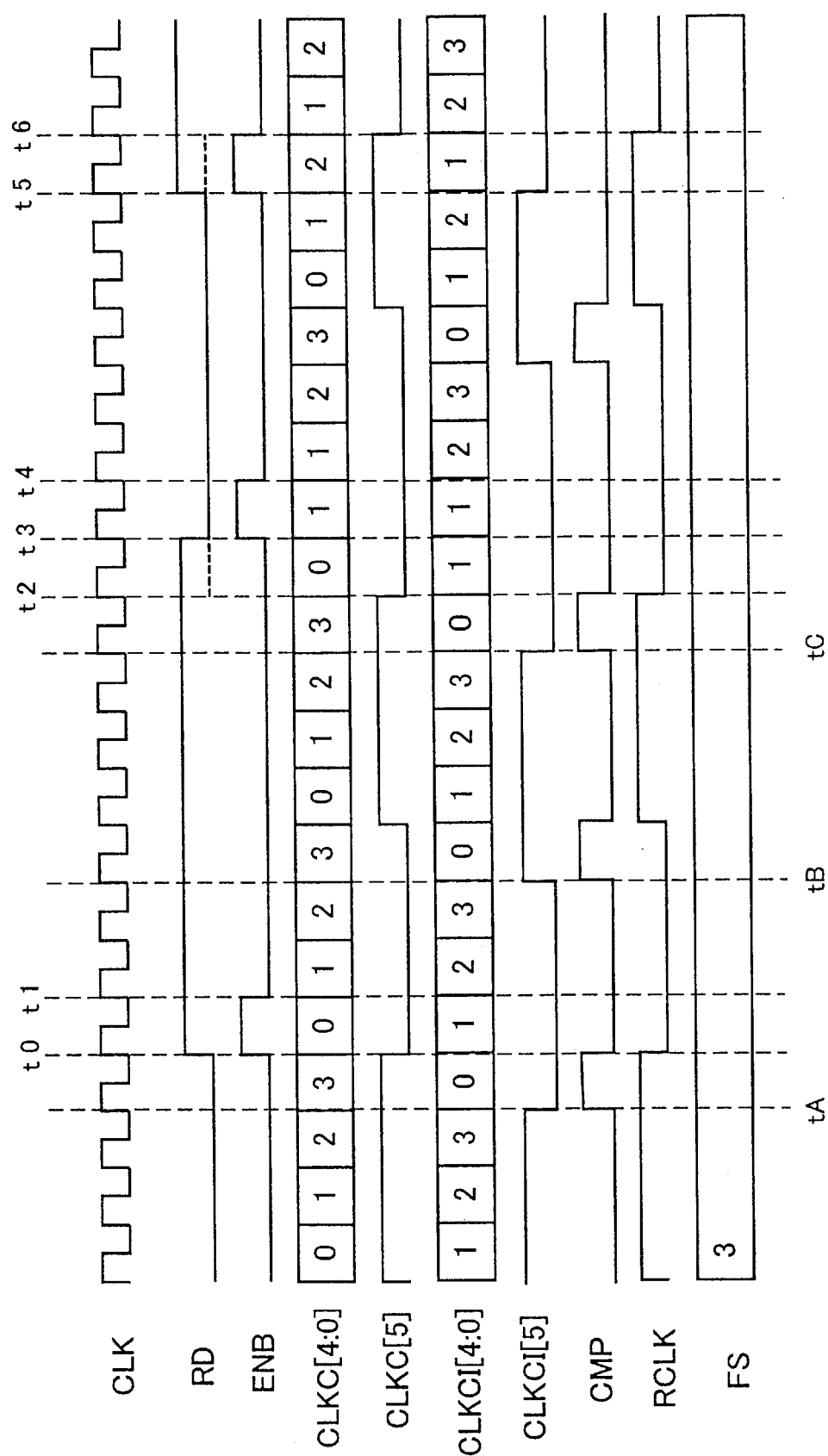
FIG. 9 is a timing chart showing the operation of the logic LSI, shown in FIG. 6.

Next the operation of the clock generating circuit 314, shown in FIG. 8 is described in reference to a timing chart shown in FIG. 9. Until time tA, the signal ENB is zero and the signal CMP is zero, so that CLKCI includes the last five bits corresponding to the output of the adder 320 and the first one bit of CLKC[5]. At time tA, signal FS(=3) is the same as CLKC[4:0], the comparator 321 supplies a CMP indicating one "1". Since the signal ENB is zero "0" and CMP is one "1", CLKCI includes the last five bits corresponding to "00000" and the first one bit of zero "0", which is the inverted value of CLKC[5].

At time t0, since the signal ENB is one "1" and CMP is zero "0", CLKCI becomes "000001". Since both the signals ENB and CMP keep zero "0" in a period of time between t1 to tB, CLKCI includes last five bits corresponding to the output of the adder 320 and the first one bit of CLKC[5]. At time tB, since CLKC[4:0] is the same as the signal FS(=3), the signal CMP becomes one "1". In this case, CLKCI includes last five bits of zero and the first one bit of one "1", which is the inverted value of CLKC[5]. Since both the signals ENB and CMP keep zero until time tC, CLKCI includes last five bits corresponding to the output of the adder 320 and the first one bit of CLKC[5].

At time tC, since CLKC[4:0] is the same as the signal FS(=3), the signal CMP becomes one "1". Since the signal ENB is zero "0" and the signal CMP is one "1", CLKCI includes last five bits of zero and the first one bit of zero "0", which is the inverted value of CLKC[5]. Namely, CLKCI indicates zero "0". In the same manner, CLKCI is generated and is supplied to the 6-bit register 316 in synchronization with the base clock CLK.

Now the operation of the logic LSI 300, shown in FIG. 6 is described in reference again to the timing chart shown in FIG. 9. It is assumed that the input data RD is undesirably phase-shifted, so that the signal RD is turned in level to high at t0, to low at t3 and is turned to high at t5. In the normal operation in which no phase-shift is made to the input data RD, the input data RD would be turned in level to low at t2 and is turned to high at t6, as shown with a dashed line. It is also assumed that the frequency of the base clock CLK is eight times greater than the normal frequency of the input data RD, so that the frequency register 312 provides the signal FS indicating "3".

When the input data RD is turned in level to high "1" at t0, the signal ENB is turned to "1". The signal CMD is turned to "0" at t1. The signal ENB is turned to high "1" for one cycle of the base clock CLK every time when the input data RD is level-turned.

The CLKC is incremented continuously, and the CLKC [4:0] is reset to zero "0" and CLKC[5] is reversed or inverted when CLKC[4:0] becomes FS(=3) at t0. When the signal ENB turns to one "1" at t0, CLKCI[4:0] is set to one "1". After that, CLKC[4:0] turns to one "1" at t1. CLKC [4:0] is a value indicated by the $0^{th}$ to $4^{th}$ (last four bits) of a signal CLKC, and CLKC[5] is a value indicated by the $5^{th}$ bit (first one bit) of the signal CLKC[5].

When CLKC[4:0] becomes F(=3), CLKC[5] is reversed or inverted and CLKC[4:0] is turned to zero "0" at t2. CLKC[4:0] is incremented by one at t3. When the signal ENB becomes one "1", CLKC[4:0] is turned to one "1" at t4 and t6. CLKC[5] is used as the sampling clock RCLK so that the sampling clock RCLK is always level-turned after four clock cycles of the base clock CLK, since the input data RD is first turned in level (t0). In other words, the sampling clock RCLK has a sampling point right in the middle of the normal cycle of the input data RD.

As it can be understood, according to the second preferred embodiment, the sampling clock RCLK is generated right in the middle of the normal cycle of the input data RD; and therefore, the input data RD can be sampled at an appropriate point or timing even if it is phase-shifted to some extent. As a result, the chance of sampling error is reduced.

Further, according to this embodiment, the sampling point can be provided at the same timing from the level-turning point of the input data RD regardless the frequency of the base clock CLK. For instance, the sampling point is provided after four cycles of base clock from the detected level-turning point (t0) of the input data RD.

Third Preferred Embodiment

Figure 10:
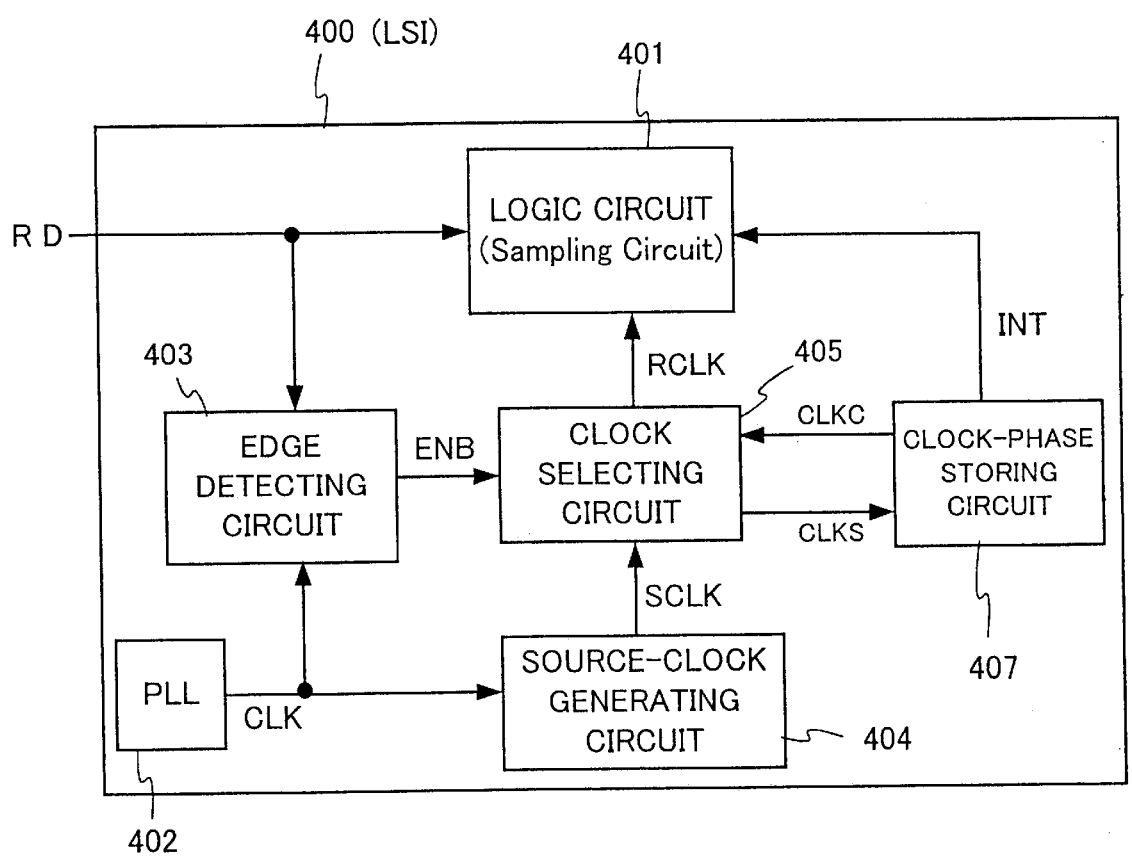
FIG. 10 is a block diagram showing a logic LSI according to a third preferred embodiment of the present invention.

FIG. 10 is a block diagram showing a logic LSI according to a third preferred embodiment of the present invention. A logic LSI 400 according to the third preferred embodiment includes a logic circuit 401, a PLL circuit 402, an edge detecting circuit 403, a source-clock generating circuit 404, a clock selecting circuit 405 and a clock-phase storing circuit 407. Input data RD are supplied to the logic circuit 401 and edge detecting circuit 403. The PLL circuit 402 is connected at an output terminal to input terminals of the edge detecting circuit 403 and source-clock generating circuit 404 to supply a base clock CLK thereto.

The edge detecting circuit 403 is connected to an output terminal to an input terminal of the clock-selecting circuit 405 to supply an ENB signal thereto. The edge detecting circuit 403 detects level-turning points of the input data RD in synchronization with the base clock CLK and generates the ENB signal when a level-turning point of the input data RD is detected. The source-clock generating circuit 404 is connected at an output terminal to another input terminal of the clock selecting circuit 405 to supply source clocks SCLKs thereto. The source-clock generating circuit 404 generates source-clocks SCLK[0] to SCLK[7] in synchronization with the base clock CLK supplied from the PLL circuit 402. The clock selecting circuit 405 is connected at an output terminal to another input terminal of the logic circuit 401 to supply a sampling clock RCLK thereto.

The clock-phase storing circuit 407 is connected at an input terminal to another output terminal of the clock selecting circuit 405 and is connected at output terminals of input terminals of the clock selecting circuit 405 and logic circuit 401. The clock-phase storing circuit 407 stores a plurality of selected clock numbers CLKS, supplied from the clock selecting circuit 405; and calculate the average of those numbers to supply an average data signal CLKC to the clock selecting circuit 405.

The clock selecting circuit 405 selects one clock from the eight source-clocks SCLK[0] to SCLK[7], supplied from the source-clock generating circuit 404, in response to the ENB signal, supplied from the edge detecting circuit 403. After that the clock selecting circuit 405 select one of the selected source clock and average data signal CLKC to generate a sampling clock RCLK, to be supplied to the logic circuit 401. For example, the selected source clock is used as a sampling clock RCLK when a large amount of phase shift is made; and the average data signal CLKC is used as a sampling clock RCLK when the phase shift or phase difference between the currently selected source clock SCLK and the previously selected clock is smaller than a predetermined level. If such the phase shift or phase difference is larger than a predetermined reference value causing sampling errors, the clock-phase storing circuit 407 supplies an interrupt signal INT to the logic circuit 401 so that the logic circuit 401 does not perform sampling process but gets in a standby or waiting mode.

In this embodiment, an average phase signal representing the average of phase of plural source clocks, provided in the past, is generated in the clock-phase storing circuit 407. One from the average phase signal and currently generated sampling clock is selected to provide a sampling clock RCLK to be actually used for sampling process. A previous sampling clock and currently generated sampling clock are compared to detect a phase difference between them; and the sampling operation is prohibited when the phase difference between the previous sampling clock and currently generated sampling clock is larger than a predetermined threshold value.

The edge detecting circuit 403 may be the same as the circuit 203, shown in FIG. 3; and the source-clock generating circuit 404 may be the same as the circuit 204, shown in FIG. 4. The same description for those circuits is not repeated in this embodiment.

As it can be understood, according to the third preferred embodiment, the sampling clock RCLK is generated in the middle of the normal cycle of the input data RD; and therefore, the input data RD can be sampled at an appropriate point or timing even if it is phase-shifted to some extent. As a result, the chance of sampling error is reduced.

Further according to this embodiment, it is not necessary to generate a sampling clock for each cycle of the input data. As a result, power consumption of the circuit can be reduced.

The above-described PLL circuits 202, 302 and 402 can be arranged outside the logic LSI 400.

What is claimed is:

1. A method for sampling input data, comprising:
   detecting a level-turning point of the input data;
   generating a plurality of source clocks;
   selecting one of the source clocks in response to the level-turning point of the input data;
   generating an average phase signal representing an average phase of previous selected source clocks;
   selecting one of the average phase signal and the selected source clock as a sampling clock to be actually used for sampling; and
   sampling the input data in synchronization with the sampling clock.

2. The method according to claim 1, further comprising:
   comparing a previous selected source clock and a currently selected source clock to detect a phase difference therebetween; and
   prohibiting the sampling operation when the phase difference between the previous selected source clock and the currently selected source clock is larger than a predetermined threshold value.

3. A method for sampling input data, comprising:
   providing a base clock having a frequency that is greater than a normal frequency of the input data;
   detecting a level-turning point of the input data in response to the base clock;
   generating responsive to the base clock a plurality of source clocks having different phases shifted by one cycle of the base clock one by one;
   selecting one of the plural source clocks having a first level-turning point synchronized with the level-turning point of the input data and a second level-turning point generated right in a middle of a normal cycle of the input data;
   generating an average phase signal representing an average of phases of previous selected source clocks;
   selecting one of the average phase signal and a currently selected source clock as a sampling clock to be actually used for sampling;
   comparing a previous selected source clock and the currently selected source clock to detect a phase difference therebetween;
   sampling the input data in synchronization with the sampling clock; and
   prohibiting the sampling operation when the phase difference between the previous selected source clock and the currently selected source clock is larger than a predetermined threshold value.

4. A data sampling circuit, comprising:
   an edge detecting circuit which detects a level-turning point of input data;
   a sampling clock generating circuit which generates a sampling clock in response to the level-turning point of the input data, the sampling clock generating circuit including
      a source clock generating circuit which generates a plurality of source clocks, and
      a clock selecting circuit which selects one of the source clocks;
   a clock-phase storing circuit which generates an average phase signal representing an average of phases of previous selected source clocks,
   said sampling clock generating circuit selecting one of the average phase signal and a currently selected source clock as the sampling clock to be actually used for sampling; and
   a logic circuit which samples the input data in synchronization with the sampling clock.

5. The data sampling circuit according to claim 4, wherein the clock-phase storing circuit compares a previous selected source clock to the currently selected source clock to detect a phase difference therebetween, and prohibits the sampling operation when the phase difference between the previous selected source clock and the currently selected source clock is larger than a predetermined threshold value.

6. A data sampling circuit, comprising:

a PLL (Phase Locked Loop) circuit which generates a base clock having a frequency that is greater than a normal frequency of input data;

an edge detecting circuit which detects a level-turning point of the input data in response to the base clock;

a source clock generating circuit which generates, in response to the base clock, a plurality of source clocks having different phases shifted by one cycle of the base clock one by one;

a clock selecting circuit which selects one of the plural source clocks having a first level-turning point synchronized with the level-turning point of the input data and a second level-turning point generated right in a middle of a normal cycle of the input data;

a clock-phase storing circuit which generates an average phase signal representing an average phase of previous selected source clocks, said clock selecting circuit selecting one of the average phase signal and a currently selected source clock as a sampling clock to be actually used for sampling; and a logic circuit sampling the input data in synchronization with the sampling clock, said clock-phase storing circuit comparing a previous selected source clock and the currently selected source clock to detect a phase difference therebetween, and prohibiting the sampling operation when the phase difference between the previous selected source clock and the currently selected source clock is larger than a predetermined threshold value.

* * * * *